Oct. 26, 1971   Z. BIEGANSKI   3,614,905
APPARATUS FOR WIRE AND CABLE CUTTING AND STRIPPING
Filed March 21, 1969   3 Sheets-Sheet 1

*Inventor*
ZDZISLAW BIEGANSKI

By *[signature]*
*AGENT*

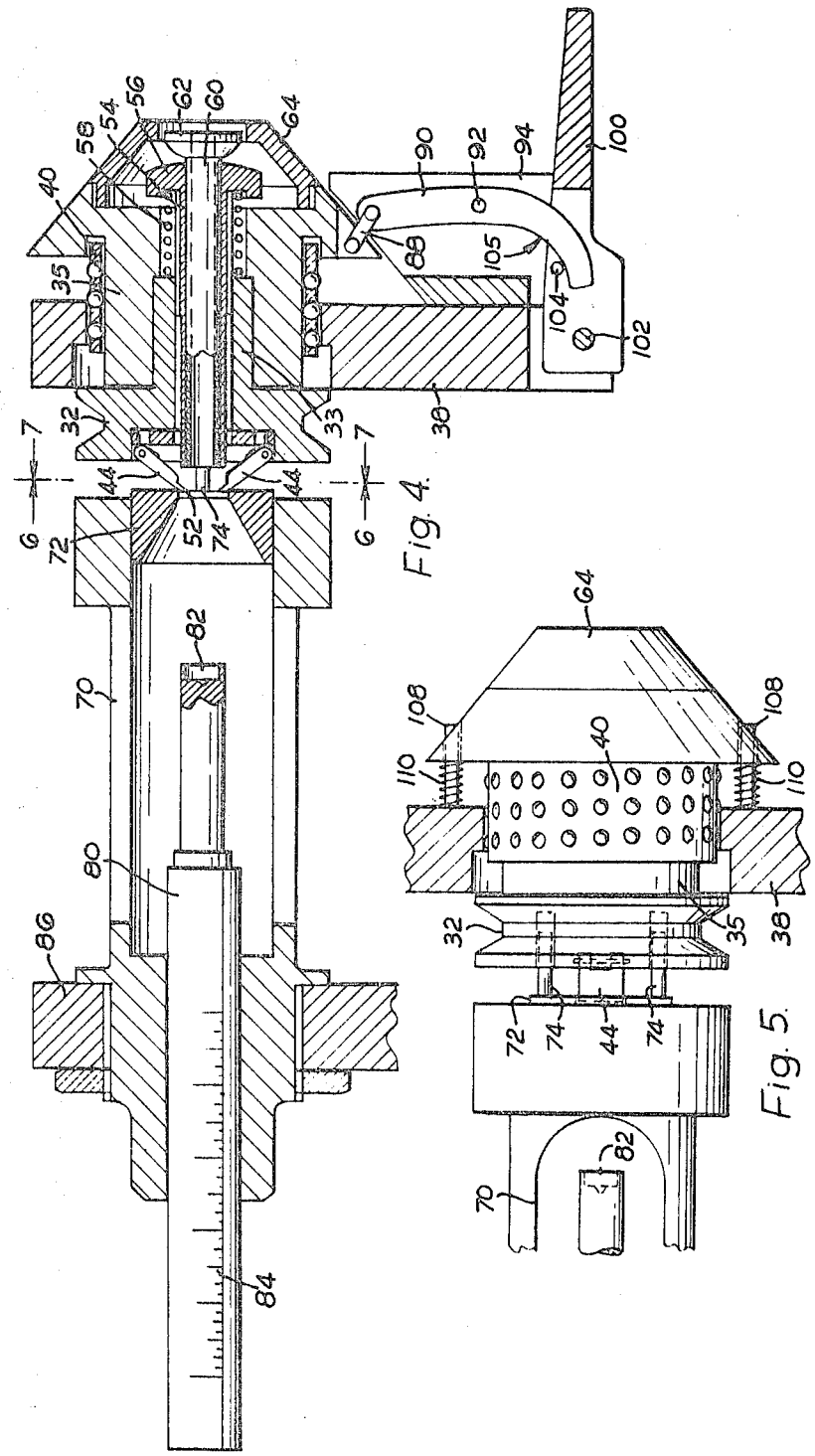

United States Patent Office 3,614,905
Patented Oct. 26, 1971

3,614,905
APPARATUS FOR WIRE AND CABLE CUTTING
AND STRIPPING
Zdzislaw Bieganski, Apem Works, St. Albans Road,
Watford, England
Filed Mar. 21, 1969, Ser. No. 809,329
Claims priority, application Great Britain, Mar. 27, 1968,
14,633/68
Int. Cl. H02g 1/12; B26b 27/00; B21f 13/00
U.S. Cl. 81—9.5                                    5 Claims

ABSTRACT OF THE DISCLOSURE

Wire and cable stripping apparatus having cutters which are rotated around the wire and are pivoted, the cutters being axially displaceable along the direction of the cable to take them against an anvil to pivot them to an operative cutting position, and stops being provided to limit the degree of pivoting and hence the depth of the cut into the cable.

This invention relates to apparatus for cutting and stripping sheaths off cables, wire and the like, and more particularly to rotary apparatus of particular but not exclusive use with co-axial cables comprising several layers of conductor and insulation requiring to be stripped at different positions. The braided conductor used in co-axial cables is particularly difficult to cut and strip.

In accordance with the invention, apparatus for a least part-severing and part-stripping sheaths from cables wire and the like, comprises a carrier apertured for the cable or like and which is rotatable, at least one cutter blade pivotally mounted on the carrier, an anvil, and means for moving the carrier and anvil relatively towards one another to pivot the blade into cutting relationship with the cable.

Other features of the invention will be apparent from the following description.

Figure 1:
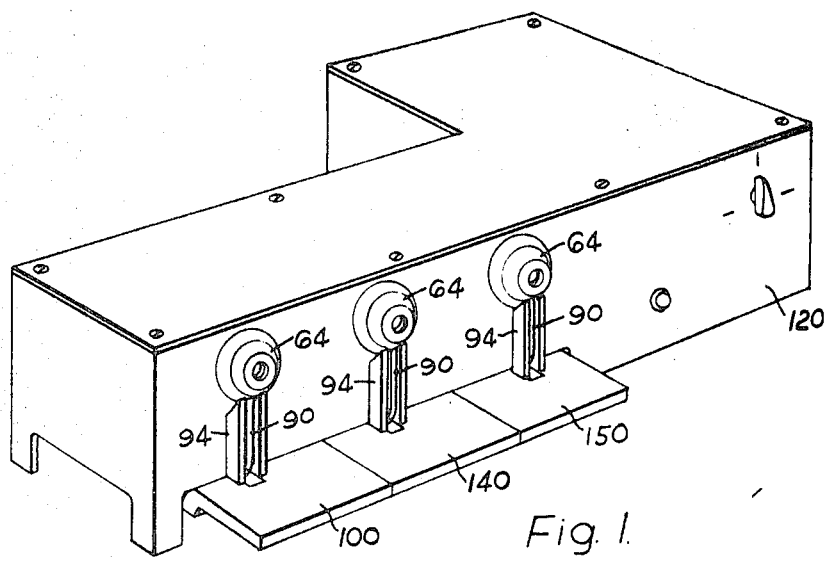
Figure 2:
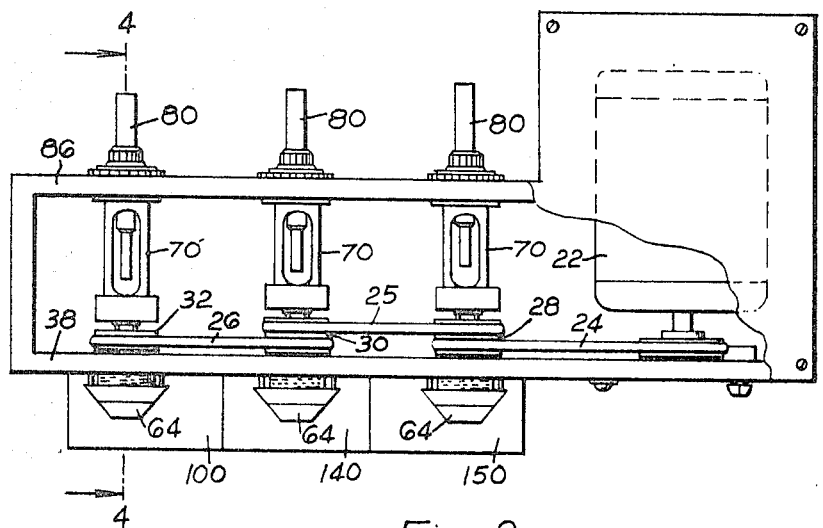
Figure 3:
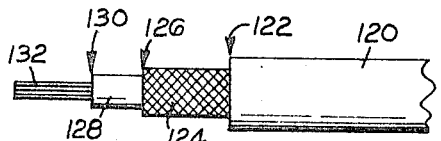
Figure 6:
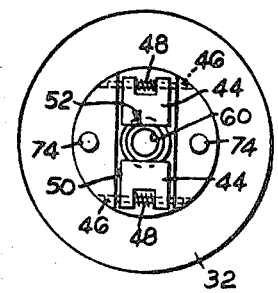
Figure 7:
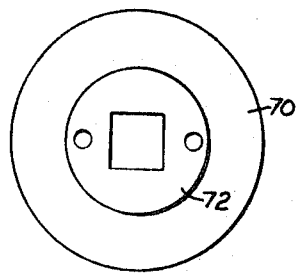
Figure 8:
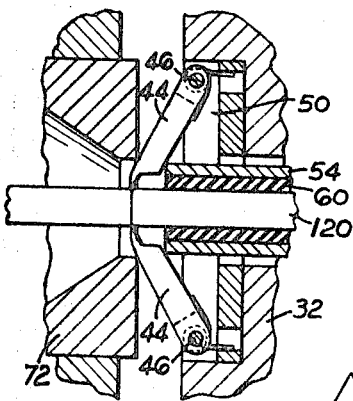
Figure 9:
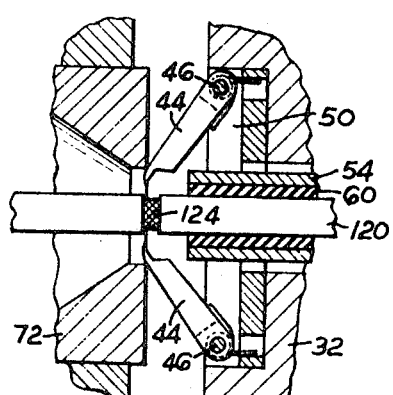
Figure 10:
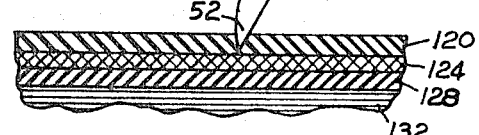
Figure 11:
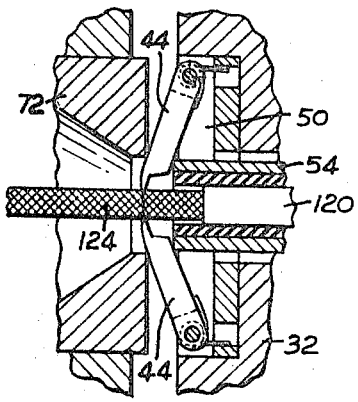
Figure 12:
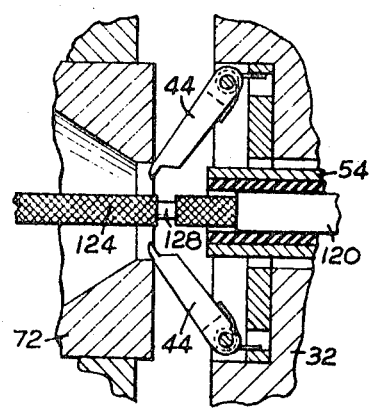

One embodiment of the invention is now described by way of example and with reference to the accompanying drawings, wherein:

FIG. 1 is a perspective view of a machine;
FIG. 2 is a plan view of the same, partly broken away;
FIG. 3 is an enlarged view of a stripped co-axial cable;
FIG. 4 is a sectional elevation, on an enlarged scale, on the line 4—4 of FIG. 2;
FIG. 5 is a fragmentary part-sectional plan of FIG. 4;
FIG. 6 is a view in the direction of arrows 6—6 of FIG. 4;
FIG. 7 is a view in the direction of arrows 7—7 of FIG. 4;
FIGS. 8 and 9 are diagrammatic fragmentary elevations;
FIG. 10 is a view cooresponding to FIG. 8, but further enlarged;
FIGS. 11 and 12 are similar to FIGS. 8 and 9.

Referring now to the drawings, the machine shown in FIGS. 1 and 2 comprises a casing 20 housing a motor 22, arranged to drive a series of belts 24, 25, 26, so that when the motor is energised, each of three drive pulleys 28, 30, 32 will be rotated on parallel fixed axes.

Three stripper assemblies are provided, but all are identical (or may be) and only one will now be described.

Referring now primarily to FIG. 4, the pulley 32 is fast with hub 33 which is journalled for rotation in sleeve 35 (via a bush or ball race, not shown) and the hub and sleeve are slidable axially in an aperture in the casing front plate 38, via ball set 40. The pulley is bored and counterbored and houses a pair of blades 44, hinged on parallel pins 46, and urged to the FIG. 4 position by torsion springs 48 (FIG. 6). Each blade is carried in a parallel sided channel 50, and has a chisel end with a cutting edge 52.

Screw-engaged with the hub 33 is an adjustor 54 having a knurled mushroom head 56, held against inadvertent adjustment by a coil spring 58 and housing a low friction liner 60, conveniently of moulded plastics with a cup or funnel end 62. The head 56 is accessible for adjustment by removing cap 64, screw-threaded in the end of the sleeve. The cap is apertured in alignment with the liner. The end of the adjustor remote from the cap projects between the blades.

Aligned with the hub and pulley is a stationary block 70 with journals anvil 72. The latter is coupled to the pulley by parallel pins 74 fast with the one and slidable in bores in the other. The anvil has a square aperture in its face opposite to the pulley.

Axially slidable in the block 70 is a stop 80, having a recess 82 in its end face, and carrying a scale 84. The stop is held captive in any desired position by a grub screw (not shown) impinging on a flat on the stop. The block is fixed to a wall 86 of the casing, opposite and parallel to wall 38.

Sleeve 35 is coupled by a link 88 to lever 90 which is pivoted at 92 in a pair of parallel webs 94. A trigger or operating lever 100 is pivoted to the wall 38 on pin 102 and has a pin 104 abutting a cam surface 105 of lever 100. Depression of the free end of the trigger pivots the lever and pushes the sleeve inwards towards the anvil, taking the hub and pulley therewith. The belts used to transmit drive can accommodate pulley displacement. Because the anvil and pulley are held against relative rotation, the blades are aligned with the square aperture in the anvil, but are deflected against these springs, until a stop position is reached. In the absence of a stop, the blades may meet, or substantially meet. But the end of the stop adjustor 54 normally provides a limit and then the blades are held between the anvil and stop as seen in FIGS. 8 or 11.

The sleeve 35 is held against rotation by pins 108 (FIG. 5) which mount return compression springs 110.

An operation of the assembly can now be described. A length of cable is pushed through the cap aperture, and into the liner bore, to emerge from the latter and enter recess 82, which acts as a stop. This can be done with the motor running, or not. With the motor running, the trigger is depressed, and this causes the blades to pivot and the chisel ends to bite into the cable sheath. Full depression of the trigger is limited by the stop position. Release of the trigger alows return of the assembly but first the cable is pulled out, and then the end portion of the sheath is stripped off.

FIG. 3 illustrates a length of co-axial cable which has undergone three succession stripping actions; firstly to sever an end portion of the outer sheath or covering 120 at the point 122; secondly to sever the braid or first conductor 124 at point 126; and thirdly to sever the inner insulation sleeve 128 at point 130. In each case the severed portion is stripped, thus leaving successive portions of the layers, and of the core conductor 132 exposed.

Hence, in the illustrated machine, the liners must be of bore suitable to accept the sheath 120, unless the distance between point 122 and the end of the cable is more than the distance between head 56 and the adjusted position of recess 82, in which event only one liner need be that large, and so on. Usually the liners can be identical and cope with the range of sizes anticipated, although co-axial cable may range from about 1/16" to over one inch in overall diameter, and hence to cope with any and all cables a range of interchangeable liners or other components or even machines may be necessary even although any one machine can cope with a part of the total range.

For each of the cuts, the difference is twofold; firstly in the distance between the blade position, which is approximately that of the anvil face, and the recess 82, so that readjustment of stop 80 aided by the scale, allows each of the three mechanisms of the illustrated machine to be set appropriately for one of the cuts. Secondly, the depth of the cut is varied, so that when stripping sheath 120 for example, braid 124 will not be damaged. To this end, the adjustment of stop 54 is material, for it limits travel of the blades. Moreover it is desirable to adjust the blades so that they cut almost but not wholly through each layer, as best seen in FIG. 10, so that the severance is completed by tearing the sheath or layer.

Certain materials used in cable construction are relatively spongy, but for any material a few trial runs is all that is necessary in order to adjust the stop 54 to a satisfactory position.

It will be appreciated that the use of pivoted blades means that each blade will only be at the ideal cutting angle when effective and when being rotated about the cable by the pulley, but satisfactory cutting is possible within an angle of tolerance on either side of the ideal angle.

It will also be appreciated that the severed portion will not always be stripped off the remaining cable, but usually a space will be created by the pulling out action, before the blades swing clear, and the final operation of pulling off the severed piece is simple.

With the machine of FIGS. 1 and 2, the co-axial cable may be stripped to the FIG. 3 condition by operation in each of the three assemblies in turn, by depressing trigger 100, later depressing trigger 140, and then 150, after appropriate insertion of the cable. Also, it is possible to make the first cut down through all of the layers to be stripped, at point 130, the second cut at point 126 and the third at point 122; the effect is the same.

Single station machines are also possible, particularly where cables having only one sheath to be stripped are involved, and where the work varies more frequently, the adjustment means may be made operable by milled headed screws instead of grub screws, and/or using an adjustor which is accessible without removing a cap.

I claim:
1. Apparatus for stripping cable, wire or the like, comprising a carrier, means for rotating said carrier about an axis thereof, said carrier having an aperture extending along the axis of rotation for receiving said cable, cutting means located at one end of said carrier, said cutting means being pivotally mounted about an axis transverse to and offset from the axis of rotation for movement toward and away from said aperture, resilient means for normally biasing said cutting means away from said aperture, an anvil spaced from one end of said carrier and aligned therewith along said axis of rotation, means for rotating said anvil conjointly with said carrier, and means for relatively displacing said rotating anvil and carrier toward and away from each other along said axis of rotation, said anvil and said cutting means cooperating to move said cutting means selectively against the normal bias of said resilient means to engage said cable at selected depths.

2. Apparatus according to claim 1, further including a sleeve extending through said carrier and adapted to surround said cable, said sleeve projecting beyond the one end of said carrier for limiting the movement of said cutting means when engaged by said anvil.

3. Apparatus according to claim 1, further including a stationary frame, said anvil being rotatably mounted within said frame, said anvil being provided with an aperture therethrough extending along the axis of rotation for receiving said cable, and means adjustably secured to said frame and extending through said anvil aperture, thereby to fix the position of said cable.

4. Apparatus according to claim 1, wherein said means for rotating said carrier comprises a motor, and further including a pulley secured to said carrier and interposed between said carrier and said anvil, slidable telescoping means coupling said carrier and said anvil for transmitting the rotation to said anvil simultaneously with the relative displacement of the carrier and anvil, and lever means manually operable for displacing the carrier along the axis of rotation.

5. Apparatus according to claim 1, wherein said cutting means comprises a pair of blades respectively pivoted on two dimetrically opposed parallel axes, and the anvil having a recess having parallel sides between which the blades extend.

References Cited

UNITED STATES PATENTS

| 1,722,087 | 7/1929 | Hartman | 81—9.51 |
| 2,827,811 | 3/1958 | Dymeck | 81—9.51 |

FOREIGN PATENTS

| 123,507 | 2/1947 | Australia. | |

OTHELL M. SIMPSON, Primary Examiner

U.S. Cl. X.R.

30—90.1